United States Patent [19]

Mueller

[11] Patent Number: 5,153,935
[45] Date of Patent: Oct. 6, 1992

[54] ARRANGEMENT FOR CONVERTING AN OPTICAL WAVE HAVING A SMALL SPOT WIDTH INTO A WAVE HAVING A LARGER SPOT WIDTH

[75] Inventor: Gustav Mueller, Munich, Fed. Rep. of Germany

[73] Assignee: Siemens Aktiengesellschaft, Munich, Fed. Rep. of Germany

[21] Appl. No.: 806,352

[22] Filed: Dec. 13, 1991

[30] Foreign Application Priority Data

Jan. 15, 1991 [DE] Fed. Rep. of Germany ....... 4100991

[51] Int. Cl.$^5$ ............................................. G02B 6/36
[52] U.S. Cl. ...................................................... 385/50
[58] Field of Search ................................. 385/50-52, 385/2-4

[56] References Cited

U.S. PATENT DOCUMENTS

| | | | |
|---|---|---|---|
| 4,669,815 | 6/1987 | Thaniyavarn | 385/50 X |
| 4,669,816 | 6/1987 | Thompson | 385/50 |
| 4,796,975 | 1/1989 | Lukas et al. | 385/50 |
| 5,062,681 | 11/1991 | Furmanak et al. | 385/50 |

OTHER PUBLICATIONS

Murakami et al, "A Very Narrow-Beam AlGaAs Laser with a Thin Tapered-Thickness Active Layer (T$^3$ Laser)", *IEEE Journal of Quantum Electronics*, vol. QE-23, No. 6, Jun. 1987, pp. 712-719.
Shani et al, "Efficient Coupling of a Semiconductor Laser to an Optical Fiber by Means of a Tapered Waveguide on Silicon", *Appl. Phys. Lett*, vol. 55, No. 23, Dec. 4, 1989, pp. 2389-2391.
Deri et al, "Efficient Fiber Coupling to Low-Loss Diluted Multiple Quantum Well Optical Waveguides", *Appl. Phys. Lett.*, vol. 55, No. 15, Oct. 9, 1989, pp. 1495-1497.
Koch et al, "Tapered Waveguide InGaAs/InGaAsP Multiple-Quantum-Well Laers", *IEEE Photonics Technology Letters*, vol. 2, No. 2, Feb. 1990, pp. 88-90.

*Primary Examiner*—Akm E. Ullah

[57] ABSTRACT

An arrangement for converting an optical wave having a small spot width into an optical wave having a larger spot width comprises a first integrated optical waveguide to which a semiconductor component may be coupled and is embedded in a second, larger optical waveguide to which a monomode fiber is to be coupled. The first optical waveguide preferably tapers as it extends into the second waveguide and ends at a distance from the end face of the second waveguide so that a first optical wave in the first waveguide will spread as a consequence of the first optical waveguide becoming thinner until the wave guidance is assumed by the second waveguide. The coupler enables coupling monomode fibers to optical semiconductor components without requiring microlenses for matching the various modes.

6 Claims, 3 Drawing Sheets

ARRANGEMENT FOR CONVERTING AN OPTICAL WAVE HAVING A SMALL SPOT WIDTH INTO A WAVE HAVING A LARGER SPOT WIDTH

BACKGROUND OF THE INVENTION

The present invention is directed to an arrangement for converting an optical wave having a small spot width into an optical wave having a larger spot width, which arrangement is used when coupling a monomode fiber to an optical semiconductor component.

When coupling a monomode fibers to an optical semiconductor component, it is necessary to match or adapt the optical modes in order to achieve high coupling efficiencies, because of the different spot diameters or widths. This usually occurs with the arrangement of micro lenses, which require at least one precision adjustment when constructing the device.

SUMMARY OF THE INVENTION

The object of the present invention is to provide an arrangement for mode matching, which can already be formed on the semiconductor chip so that a fiber can be coupled to a semiconductor component in a simple way, for example by a butt coupling or with a fiber taper.

To accomplish these goals, the invention is directed to an arrangement for converting a first waveguided optical wave having a small spot width into an optical wave matched to the spot width of a second optical wave that is guided in an optical waveguide and has a spot width which is larger relative to the spot width of the first-mentioned waveguide. The arrangement includes a first integrated-optical waveguide having a small end face matched to a small first spot width for the infeed of the first optical wave having the small first spot width that is to be guided in a longitudinally axial direction in the first waveguide and a second integrated optical waveguide having a relatively large cross section matched to a relatively large second spot width for guiding the matched optical wave in the longitudinal axial direction and having a relatively larger end face matched to the relatively larger spot width for outfeed of the matched optical wave from the second waveguide, said first and second waveguides being axially arranged parallel to one another with the first waveguide being arranged in the interior of the second waveguide and wherein the first waveguide is constructed so that the optical wave having a small spot width that is guided in the first waveguide from the smaller end face in a longitudinally axial direction to the relatively larger end face of the second waveguide propagates in the second waveguide in the longitudinal axial direction to the relatively larger end face and spreads to form the matched optical wave. The first optical waveguide ends in the second optical waveguide at a distance in front of the relatively larger end face of the second optical waveguide. Preferably, the first optical waveguide tapers in the direction toward the relatively larger end face of the second waveguide and, while tapering, it also expands in a direction perpendicular to the direction in which it tapers.

Other advantages and features of the invention will be readily apparent from the following description of the preferred embodiments, the drawings and claims.

DESCRIPTION OF THE PREFERRED EMBODIMENTS

Figure 1:
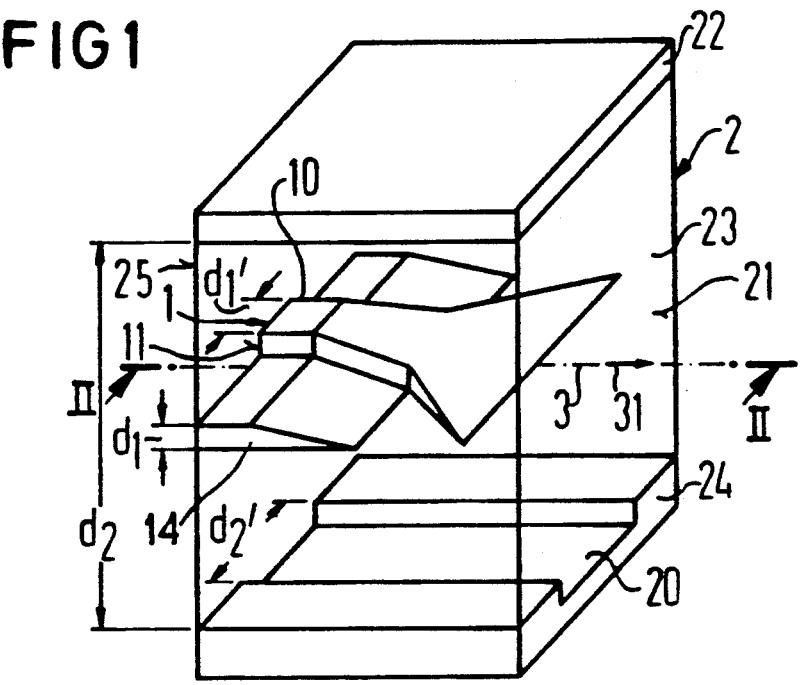
FIG. 1 is a perspective view of an example of the arrangement in accordance with the present invention.

The principles of the present invention are particularly useful when incorporated in the arrangement illustrated in FIG. 1, which has a first waveguide, generally indicated at 1, and a second waveguide, generally indicated at 2. The first waveguide 1 is a first integrated optical waveguide that is a film waveguide, such as shown in FIG. 4d, with a small end face or first end face 11 for the infeed of the first optical wave having a small spot width or size. A thickness $d_1$ of the layer 14 of the first waveguide 1 is matched to the vertical, small spot width $W_1$ of the spot 4 of the first optical wave to be infed or incoupled. The horizontal width of this waveguide is matched to the horizontal, small spot width $W_1$, of the spot 4 of the wave to be infed and is defined by the width $d_1$, of a rib 10 projecting upwardly out of the layer 14.

The layer 14 and rib 10 of the waveguide 1 are composed, for example, of InGaAsP that has a higher refractive index than, for example, the material composed of InP into which the first waveguide 1 is embedded. The waveguiding layer 23, which forms the second integrated optical waveguide 2, is composed of this material having the lower refractive index. The first waveguide 1 is arranged in this second waveguiding layer 23 and the second waveguiding layer 23 completely surrounds this first waveguide in the embodiment of FIGS. 1 and 2.

Figure 5A:
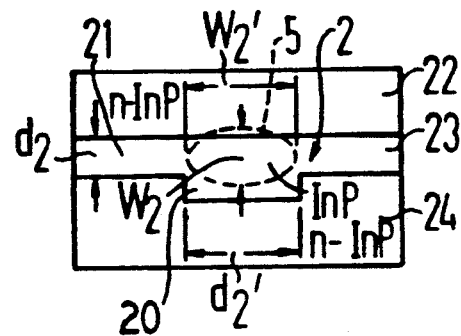
FIGS. 5a–5c are end views of the output end of the arrangement, with FIG. 5a being an end view taken from the right side of FIG. 2, FIG. 5b being the end view taken from the right end of the arrangement of FIG. 3, and FIG. 5c being a modification of the end view.

The second waveguide 2 is composed, for example, of a waveguiding layer 23 of undoped InP arranged between two layers 22 and 24 of n-doped InP, which is shown in the end view in FIG. 5a. As illustrated, the waveguide 2 has an end face 21 for outcoupling of the optical wave having a larger spot width. The thickness $d_2$ of the layer 23 is matched to the vertical, larger spot width or size $w_2$ of the spot 5 of the optical wave to be outcoupled. The horizontal width or size of this second waveguide 2 is matched to the horizontal, larger spot width $w_2$, of the spot 5 of the wave to be outcoupled and is defined by the width $d_2$, of a rib 20, which downwardly projects from the layer 23, as illustrated in FIG. 5a.

The end face 11 of the first waveguide 1, for incoupling of the optical wave having the smaller spot width, lies in an end face 25 of the second waveguide 2. The end face 21 of the second waveguide 2, for outcoupling of the optical wave having the larger spot width, faces away from this end face 25.

Figure 2:
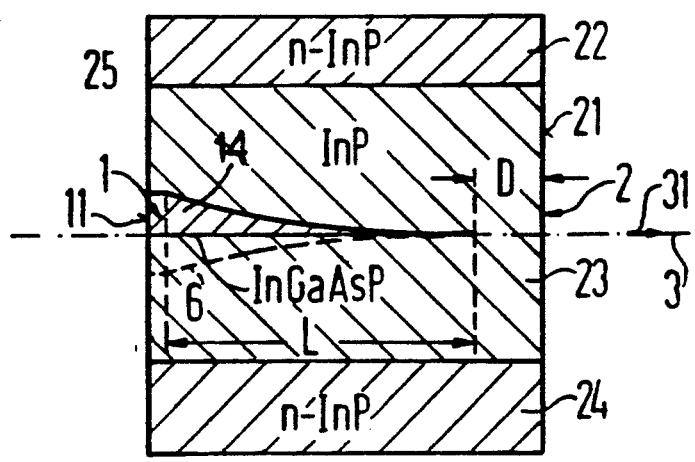
FIG. 2 is a central longitudinal cross sectional view taken along the line II—II of FIG. 1.

The first waveguide 1 ends at a distance D (see FIG. 2) in front of the end face 21 for outcoupling of the optical waveguide having the larger spot width of the second waveguide 2 and tapers from the end face 11 for infeed in a longitudinal direction 31 toward the end face 21 for outcoupling, for example, so that the first waveguide 1 becomes thinner in a continuously or stepped fashion perpendicular to a horizontal plane of the layer 14 and of the layer 23 of the second waveguide 2, as shown in FIGS. 1 and 2. The plane of the layers 14 and 23 in FIG. 2 will extend perpendicular relative to the plane of the drawing an contains a longitudinal axis 3 of the first waveguide 1 and the second waveguide 2.

The tapering, first waveguide 1 should be optimally symmetrical relative to the plane of the layers 14 and 23, as indicated in broken lines 6 in FIG. 2.

Figure 3:
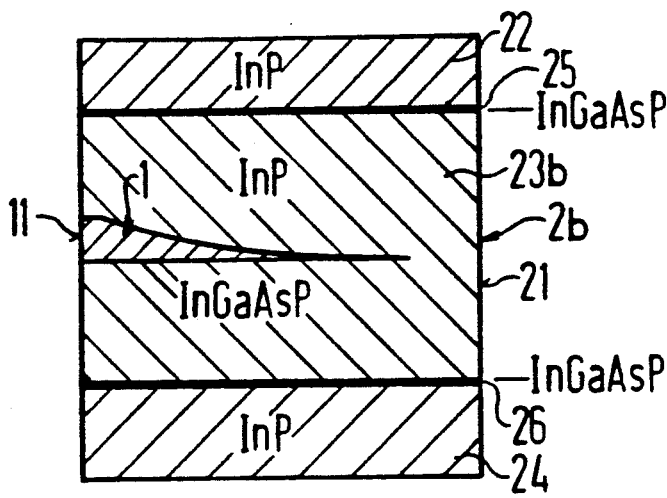
FIG. 3 is a cross sectional view similar to FIG. 2 of an embodiment of the invention.

The construction or fashioning that is somewhat asymmetrical relative to this plane and wherein the tapering, first waveguide 1 is fashioned at only one side of this plane, as shown in FIGS. 1 2 and 3, is often easier to manufacture in technological terms and often satisfies the practical demands, particularly when the small spot width $w_1$ is extremely small in comparison to the larger spot width $w_2$, for example when the smaller spot width is one or two orders smaller than the larger spot width $w_2$. This, for example, is the case when a semiconductor laser diode is to be coupled to an optical fiber, for example to a monomode fiber.

While the wave fed into and guided in the tapering, first waveguide 1 propagates in the longitudinal direction 31, it widens as a consequence of the first waveguide 1 that is becoming thinner until the wave guidance is assumed by the second waveguide 2.

The widening of the infed and guided wave perpendicular to the axis 3 parallel to the plane of the layers 14 and 23 can be achieved by a broadening of the first waveguide 1 in this direction. It is adequate in the example of FIG. 1 to broaden the rib 10 in a continuous or stepped fashion in the longitudinal axial direction 31, as shown in FIG. 1.

The length L of the tapering, first waveguide 1 in the longitudinal axial direction 31 should be selected so that the guided modes are adiabatically converted into one another. A tapering waveguide 1 that is too short leads to emission losses and to the excitation of higher modes. On the other hand, an excessively long, tapering, first waveguide 1 will increase the chip area required. A beneficial compromise can be made herein.

The embodiment of the first optical waveguide 1 is based on the type of component generating the wave to be coupled or infed, for example on lasers, amplifiers, filters and/or switches that can be integrated on a common chip together with the arrangement of the present invention.

Figure 4A:
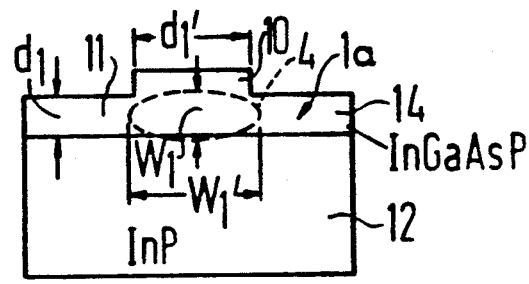
FIGS. 4a–4d are end views of an input end of the arrangement, with FIG. 4d being the left side of the embodiment of FIG. 2, FIG. 4a being a modification of the arrangement of FIG. 4d, FIG. 4b being another modification, and FIG. 4c being a third modification.
Figure 4B:
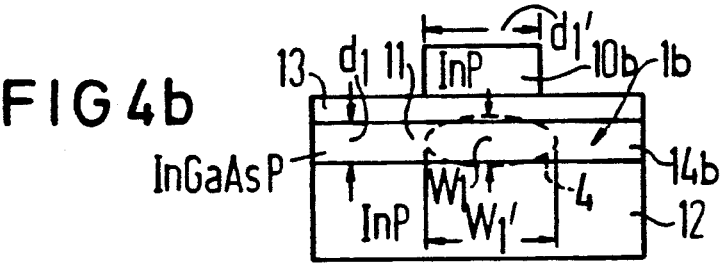
Figure 4C:
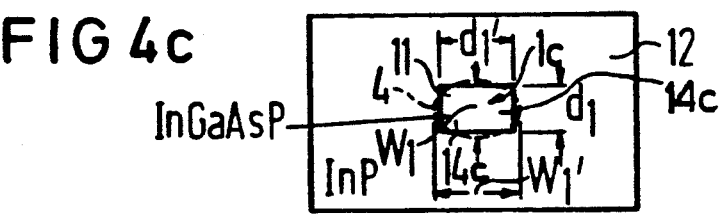
Figure 4D:
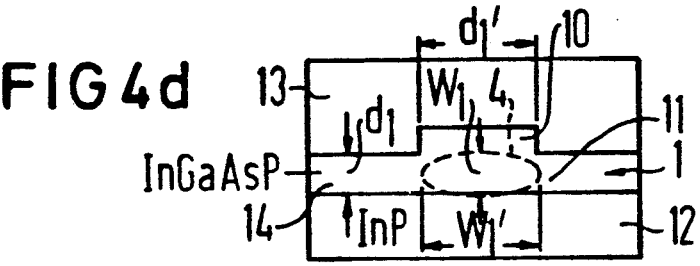

In addition to the embodiment of the first waveguide 1 shown in FIG. 4d and employed in the example of FIG. 1, the embodiments of the first waveguide 1a, 1b and 1c, which are shown in FIGS. 4a–4c, can be utilized. The embodiment 1a of the first waveguide illustrated in FIG. 4a differs rom that of the waveguide 1 in FIG. 4d in that in the embodiment of the waveguide 1 in FIG. 4d, the layer 14 is between two layers 12 and 13, which may be, for example, InP. In the embodiment of the waveguide 1a of FIG. 1, the waveguide layer 14 lacks the layer 13.

In the embodiment of the first waveguide 1b illustrated in FIG. 4b, a rib 10b, which has the width $d_1$, which is adapted to the spot width $w_1$, is separated from the layer 14b by a layer 13 and is composed of InP. In the embodiment of the waveguide 1c shown in FIG. 4c, only a strip-shaped waveguide layer 14c having a thickness $d_1$ and a width $d_1$, is utilized. this is completely embedded in the material 12. The layer 14c is composed in InGaAsP or n-doped InP, while the surrounding material 12 is composed of InP.

The embodiments of the second waveguide 2 is based on the component to be coupled to the end face 21 thereof, for example a monomode fiber. The geometry of this second waveguide 2 is to be designed so that the guided optical wave is optimally well matched to the monomode fiber or to some other component to be coupled thereto.

Figure 5B:
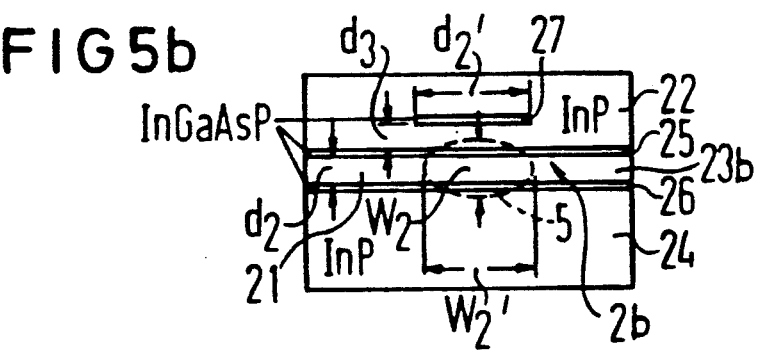
Figure 5C:
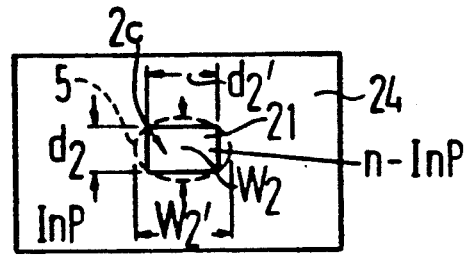

In addition to the embodiment of the waveguide 2 shown in FIG. 5a, additional possible embodiments are the second waveguides 2b, and 2c, of FIGS. 5b and 5c, respectively. In the embodiment of the waveguide 2b of FIG. 5b, the waveguiding layer 23b is defined by a layer of InP having a thickness $d_2$ that is arranged between two layers 25 and 26 of InGaAsP that is relatively thin in comparison to the layer 23. The width $d_{2'}$ of the second waveguide 2b is defined by a further, thin layer 27, which is spaced t a distance $d_3$ from the layer 23b and is embedded in a layer 22 of InP that adjoins the layer 25. The layer 24 of InP adjoins the layer 26.

The exemplary embodiment of FIG. 3 is realized with a second waveguide 2b of FIG. 5b, wherein the layer 27 in the layer 22 is not illustrated in FIG. 3.

The embodiment 2c of FIG. 5c corresponds to the embodiment 1c of FIG. 4c, except for the dimensions. Thus, the waveguide material for the waveguide 2c has a rectangular shape with the dimensions $d_2$ and $d_{2'}$.

The embodiments of FIGS. 4a–4d of the first waveguide 1 and the embodiments 5a–5c of the second waveguide 2 can be arbitrarily combined with one another insofar so this is compatible with the technology of manufacture.

Although various minor modifications may be suggested by those versed in the art, it should be understood that I wish to embody within the scope of the patent granted hereon all such modifications as reasonably and properly come within the scope of my contribution to the art.

I claim:

1. An arrangement for converting a waveguided first optical wave having a small first spot width into an optical wave matched to the spot width of a second optical wave that is guided in an optical waveguide that has a second spot width that is larger relative to the spot width of the first optical wave, said arrangement comprising a first integrated optical waveguide having a small end face matched to the small first spot width for the infeed of the first optical wave having the small first spot width, which is guided in a longitudinal axial direction in the first waveguide, a second integrated optical waveguide having a relatively large cross section matched to a relatively larger spot width for guiding a matched optical wave in the longitudinal axial direction and having a relatively larger second end face matched to the relatively larger second spot width for outfeed of the matched optical wave of the second waveguide, said first and second waveguides being arranged to extend parallel to each other with the first waveguide being arranged in the interior of the second waveguide and the first waveguide being constructed so that the first optical waveguide having the first spot width is guided in the first waveguide from the small end face in a longitudinal axial direction to a relatively larger second end face of the second waveguide and is coupled over to and propagates in the second waveguide in a longitudinal axial direction to the relatively larger second end face and spreads to form the matched optical wave.

2. An arrangement according to claim 1, wherein the first waveguide ends in the second waveguide at a distance in front of the relatively larger second end face of the second waveguide.

3. An arrangement according to claim 2, wherein the first waveguide tapers in one direction as the first waveguide approaches the relatively larger second end face of the second waveguide.

4. An arrangement according to claim 3, wherein the first waveguide broadens in a direction perpendicular to the one direction of tapering as it extends toward the second end face.

5. An arrangement according to claim 1, wherein the first waveguide tapers in one direction as it extends toward the relatively larger second end face of the second waveguide.

6. An arrangement according to claim 5, wherein the first waveguide broadens in a direction extending perpendicular to said one direction as the waveguide extends toward the second end face of the second waveguide.

* * * * *